(12) United States Patent
Himmer et al.

(10) Patent No.: US 12,095,276 B2
(45) Date of Patent: Sep. 17, 2024

(54) GROUND ASSEMBLY FOR AN INDUCTIVE CHARGING DEVICE

(71) Applicant: Mahle International GmbH, Stuttgart (DE)

(72) Inventors: Thomas Himmer, Reichenbach (DE); Christopher Laemmle, Stuttgart (DE); Holger Schroth, Maulbronn (DE); Martin Steinbach, Waiblingen (DE)

(73) Assignee: Mahle International GmbH (DE)

( * ) Notice: Subject to any disclaimer, the term of this patent is extended or adjusted under 35 U.S.C. 154(b) by 456 days.

(21) Appl. No.: 17/489,755

(22) Filed: Sep. 29, 2021

(65) Prior Publication Data

US 2022/0103012 A1    Mar. 31, 2022

(30) Foreign Application Priority Data

Sep. 30, 2020   (DE) .......................... 102020212388.8

(51) Int. Cl.
| | |
|---|---|
| *H02J 50/00* | (2016.01) |
| *B60L 53/12* | (2019.01) |
| *B60L 53/302* | (2019.01) |
| *H01F 27/08* | (2006.01) |
| *H01F 38/14* | (2006.01) |
| *H02J 50/10* | (2016.01) |
| *H02J 50/70* | (2016.01) |

(52) U.S. Cl.
CPC ............ *H02J 50/005* (2020.01); *B60L 53/12* (2019.02); *B60L 53/302* (2019.02); *H01F 27/085* (2013.01); *H01F 38/14* (2013.01); *H02J 50/10* (2016.02); *H02J 50/70* (2016.02)

(58) Field of Classification Search
CPC .......... H02J 50/005; H02J 50/10; H02J 50/70; B60L 53/12; B60L 53/302; H01F 27/085; H01F 38/14
USPC ......................................................... 361/676
See application file for complete search history.

(56) References Cited

U.S. PATENT DOCUMENTS

| | | | |
|---|---|---|---|
| 9,254,755 B2* | 2/2016 | Bachmaier | .............. B60L 53/38 |
| 9,296,304 B2* | 3/2016 | Krause | .................... B60L 53/60 |
| 9,550,427 B2* | 1/2017 | Takeshita | ............... B60M 7/003 |
| 9,827,865 B2* | 11/2017 | Zhou | ................... H01M 50/251 |
| 9,862,282 B2 | 1/2018 | Boser et al. | |

(Continued)

FOREIGN PATENT DOCUMENTS

| | | |
|---|---|---|
| DE | 10 2013 010 695 A1 | 8/2014 |
| DE | 10 2019 216 970 A1 | 5/2020 |
| EP | 2 808 976 A1 | 12/2014 |

OTHER PUBLICATIONS

English abstract for EP-2808976.

*Primary Examiner* — Anatoly Vortman
(74) *Attorney, Agent, or Firm* — Fishman Stewart PLLC

(57) ABSTRACT

A ground assembly for an inductive charging device for inductively charging a motor vehicle parked on a subsurface is disclosed. The ground assembly includes a baseplate that extends transversely to a gap direction, a coil that includes at least one coil winding spaced apart from the baseplate in the gap direction, a core assembly spaced apart in the gap direction from the baseplate and the coil, and a mounting support for holding the core assembly. The mounting support includes a support structure that is spaced apart from the baseplate in the gap direction and positions at least one core body of the core assembly.

20 Claims, 4 Drawing Sheets

(56) References Cited

U.S. PATENT DOCUMENTS

| | | | |
|---|---|---|---|
| 9,889,755 B2* | 2/2018 | Frament | B60L 53/12 |
| 10,059,207 B2* | 8/2018 | Thoemmes | B60K 28/14 |
| 10,447,086 B2* | 10/2019 | Yuasa | H01F 27/02 |
| 11,167,643 B2* | 11/2021 | Li | B60L 58/12 |
| 11,387,673 B2* | 7/2022 | Koenig | H01F 38/14 |
| 11,498,437 B2* | 11/2022 | Laemmle | H02J 50/70 |
| 11,521,789 B2* | 12/2022 | Laemmle | B60L 53/122 |
| 11,548,400 B2* | 1/2023 | Laemmle | B60L 53/302 |
| 11,552,502 B2* | 1/2023 | Laemmle | H02J 50/10 |
| 11,831,168 B2* | 11/2023 | Boettigheimer | H02J 7/0042 |
| 2013/0181667 A1* | 7/2013 | Takeshita | B60L 53/12 |
| | | | 320/108 |
| 2017/0237295 A1* | 8/2017 | Yuasa | H01F 38/14 |
| | | | 307/104 |
| 2020/0139829 A1* | 5/2020 | Laemmle | H02J 50/005 |
| 2020/0143978 A1* | 5/2020 | Laemmle | H01F 27/025 |
| 2020/0403448 A1* | 12/2020 | Laemmle | B60L 53/302 |
| 2021/0129694 A1* | 5/2021 | Laemmle | B60L 53/12 |
| 2022/0103012 A1* | 3/2022 | Himmer | H01F 27/025 |

* cited by examiner

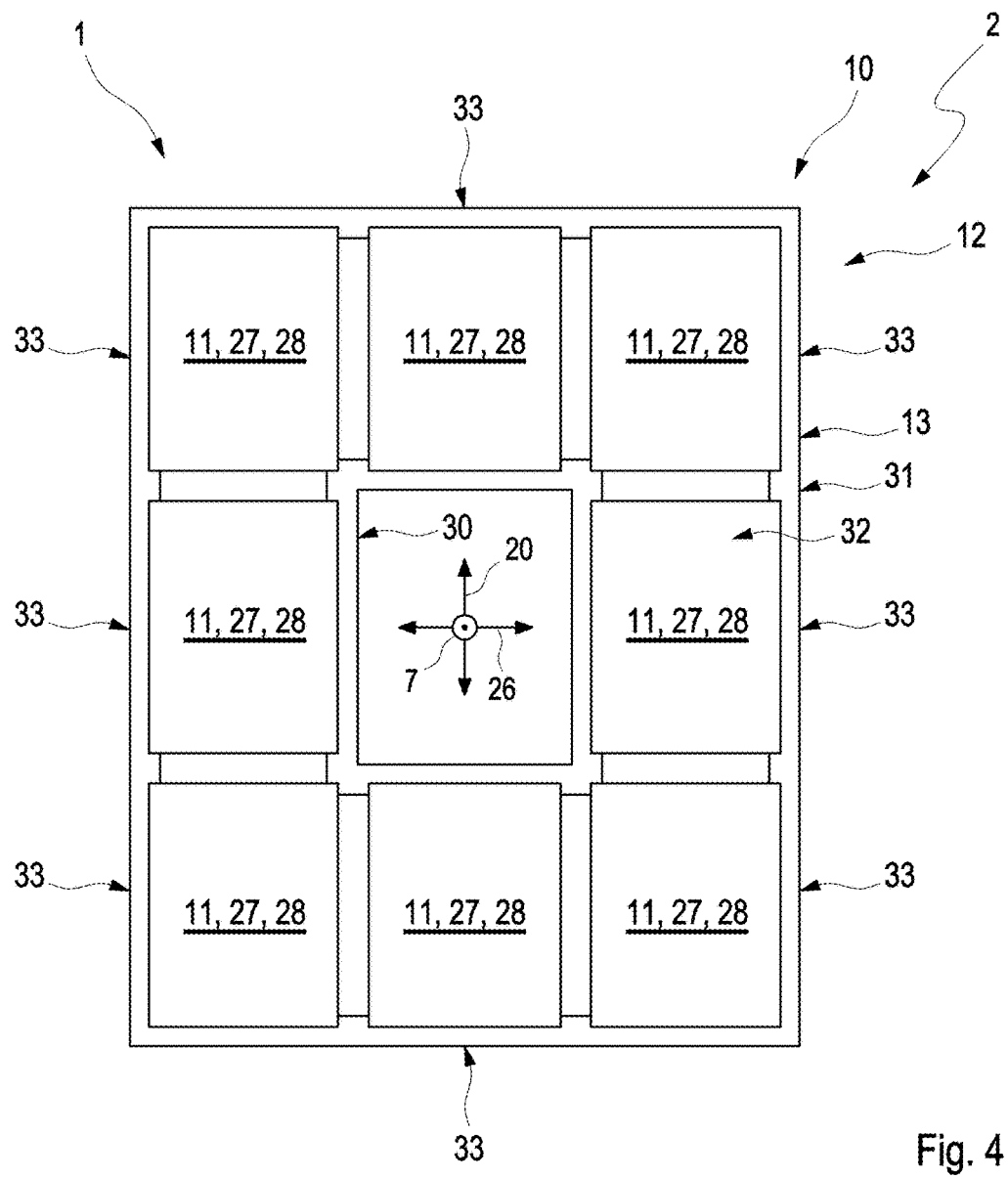
Fig. 4
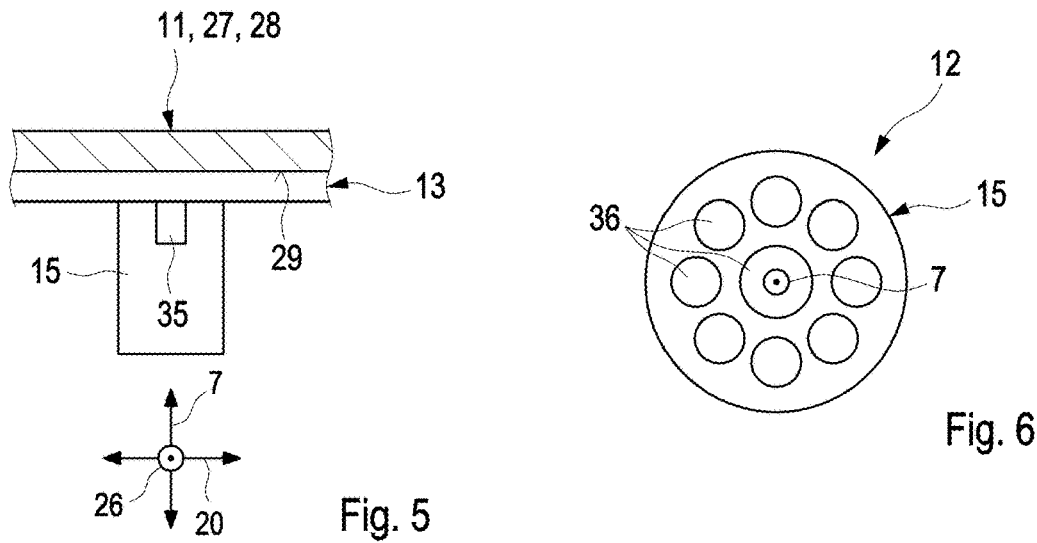
Fig. 5
Fig. 6

GROUND ASSEMBLY FOR AN INDUCTIVE CHARGING DEVICE

CROSS-REFERENCE TO RELATED APPLICATION

This application claims priority to German Application No. DE 10 2020 212 388.8 filed on Sep. 30, 2020, the contents of which are hereby incorporate by reference in its entirety.

TECHNICAL FIELD

The invention relates to a ground assembly for an inductive charging device for inductively charging a motor vehicle, which, during usage for charging the motor vehicle, is arranged underneath the motor vehicle.

BACKGROUND

In electrically or part-electrically driven motor vehicles a regular charging of an electrical energy store of the motor vehicle is necessary. For this purpose, a direct electrical connection between the motor vehicle and an external electrical energy source, for example a power connection, can be established. However, this requires a manual activity of a user.

It is known, furthermore to inductively charge the motor vehicle, i.e. in particular the electric energy store, which can be for example an accumulator. Corresponding charging devices each comprise an assembly in the motor vehicle and outside the motor vehicle. In the assembly outside the motor vehicle a primary coil is located, which inductively interacts with a secondary coil of the assembly in the motor vehicle in order to charge the motor vehicle. The assembly in the motor vehicle is also referred to as motor vehicle assembly or vehicle assembly. Generally, the assembly outside the motor vehicle is located during the operation underneath the motor vehicle and is also referred to as ground assembly.

During the operation of the charging device, the motor vehicle to be charged is situated on a subsurface. The ground assembly is usually placed on the subsurface, in particular lies on the subsurface. Likewise, the ground assembly can at least partly form the subsurface. It is also conceivable to arrange the ground assembly under the subsurface. In any case, the ground assembly has to be designed in such a manner that it can support heavy loads, in particular also the load of motor vehicles which are charged with the charging device. This is also important in particular because the motor vehicles for charging are driven onto the subsurface and away from the subsurface. In this connection, in particular during shunting, the motor vehicle can transfer corresponding loads onto the ground assembly even when the motor vehicle in the intended instance of usage during the charging operation does not per se transfer any direct load onto the ground assembly. This means that in the ideal case the motor vehicle does not drive directly over the ground assembly, but this can indeed happen for example during the shunting. For this reason it is necessary to design the ground assembly in particular for loads that can occur when being driven over.

During the operation of the charging device, heat can develop in the respective assembly, in particular in the ground assembly, in particular caused by the power outputs to be generated. In the case of the ground assembly, this heat can lead to an undesirable temperature increase of the ground assembly and/or neighbouring objects.

The present invention deals with the object of stating an improved ground assembly for an inductive charging device of the type mentioned at the outset, which is characterised in particular by a simplified construction and an increased output.

According to the invention, this object is solved through the subject of the independent claim(s). Advantageous embodiments are subject of the dependent claims.

SUMMARY

The present invention is based on the general idea of equipping a ground assembly of an inductive charging device with a baseplate extending plate-shaped transversely to a gap direction, wherein a coil and a core assembly for the magnetic flux control are spaced apart from the baseplate in the gap direction and, in usage, from a motor vehicle to be charged, and wherein a mounting support supports the core assembly on the baseplate via at least one locally arranged support body. Supporting the core assembly via the at least one support body leads to an effective transfer of loads from the core assembly to the baseplate, so that a mechanically stable formation of the ground assembly with simultaneously prevented or at least reduced risk of damage, in particular breaking risk of the core assembly, is realised. At the same time, a flow space is formed through the local arrangement of the at least one support body between the core assembly and the baseplate, through which between the core assembly and the baseplate heat can be transferred in order to effectively cool the ground assembly. The effective cooling of the ground assembly results in that the ground assembly can be operated with an increased output and an increased efficiency. The increased output, which can amount to multiple kW allows in particular an accelerated charging of the motor vehicle to be charged. In addition, the electromagnetic influence of the baseplate on the core assembly and/or on the coil is at least reduced through the spaced-apart arrangement of the baseplate from the coil. As a consequence, interferences of the magnetic field generated with the coil are at least reduced. Thus, the inventive idea leads to an improved mechanical stability with increased efficiency of the ground assembly at the same time.

According to the inventive idea the ground assembly comprises the baseplate. The baseplate furthermore comprises the coil which includes at least one coil winding. In addition, the ground assembly comprises the core assembly which in the gap direction is spaced apart from the baseplate and from the coil, and which serves for the magnetic flux control. Here, the core assembly is arranged in the gap direction between the baseplate and the coil winding. The core assembly comprises at least one core body which is formed plate-shaped and runs plate-shaped transversely to the gap direction. The mounting support comprises a mounting structure which is spaced apart from the baseplate in the gap direction. Here, the at least one core body is positioned by way of the mounting structure. In the gap direction, the mounting structure is spaced apart from the baseplate so that between the mounting structure and the baseplate a hollow space is formed which in the following is also referred to as lower hollow space. Furthermore, the mounting support comprises at least one support body between the mounting structure and the baseplate which extends in the gap direction through the lower hollow space and is supported on the baseplate and thus supports the core assembly on the baseplate. The respective at least one support body extends locally through the lower hollow space so that the at least one support body leaves a flow space in the lower hollow space through which a flow path leads.

Here, the local extension of the at least one support body through the lower hollow space means that the at least one support body penetrates the lower hollow space, but does not fill out the same. Thus, the flow space remains in the lower hollow space. Preferably, the flow space is larger than the space occupied by the at least one support body.

Preferably, at least one of the at least one core bodies, particularly preferably the respective core body, is supported on one of the at least one support bodies with its lower side facing the baseplate. This means that the support surface, with which the lower side lies on the support body, is smaller than the entire lower side. Thus, there is no local load transfer from the core body into the support body. Thus, the reduced bending stress achieved results in a reduced risk of damage, in particular risk of breakage of the core bodies.

Advantageously, the mounting structure positions and holds the at least one core body in a plane running transversely to the gap direction. It is preferred when the mounting structure holds and positions the at least one core body transversely to the gap direction.

In particular, at least one of the at least one core bodies, advantageously the respective core body, is supported with the lower side exclusively on one of the at least one support bodies. A load transfer in the gap direction in the direction of the baseplate thus takes place exclusively by way of the at least one support body. This leads to a further reduced bending stress of the at least one core body and thus to a particularly effective reduction of the risk of damage and/or risk of breakage of the at least one core body.

During usage, the coil and the core assembly are practically arranged on the side of the baseplate facing the motor vehicle to be charged. In the process, the vehicle drives onto or parks on a subsurface for the inductive charging. The gap direction practically runs parallel to a normal of the subsurface. Thus, the baseplate extends practically along the subsurface.

The baseplate of the ground assembly during usage is preferentially arranged on the subsurface. In particular, the baseplate is supported on the subsurface.

It is also conceivable to arrange the baseplate in the gap direction below the subsurface. It is also conceivable to arrange the ground assembly entirely below the subsurface.

During the operation, the coil generates a magnetic field. The core assembly with the at least one core body serves for the magnetic flux control. Here, the core assembly ensures that a propagation of the magnetic field in the direction of the baseplate is prevented or at least reduced. This leads in particular to a reduction of energetic losses and consequently an increase of the efficiency. For this purpose, the at least one core body has a relative magnetic permeability $\mu_r$ of at least two. Thus: $\mu_r \geq 2$ applies to the relative magnetic permeability $\mu_r$ of the at least one core body. In addition, the at least one core body is electrically isolated from the coil for this purpose.

The arrangement of coil spaced apart from the core assembly can be realised by means of a spacer plate arranged between the coil and the core assembly. Practically, the spacer plate is electromagnetically inactive, preferentially a plastic spacer plate. Here, the top side of at least one of the at least one core bodies facing away from the baseplate can lie against the spacer plate. It is also conceivable that the coil winding lies at least partly on the spacer plate.

Generally, the core assembly can comprise a single core body.

Preferred are embodiments, in which the core assembly comprises two or more such core bodies. Thus, the mechanical stability of the core assembly is increased, in particular since the risk of breakage is reduced with decreasing size of the core bodies.

Preferably, the respective core body is a ferrite body, preferentially a ferrite plate.

Advantageously, the ground assembly comprises a cover located opposite the baseplate in the gap direction, wherein the coil and the core assembly are arranged between the baseplate and cover. Cover and baseplate preferably delimit in the gap direction a volume in which the coil and the core assembly as well as the mounting support are arranged. The lower hollow space is thus arranged in the volume, is in particular a part of the volume.

The coil and the core assembly are preferably spaced apart from the cover in the gap direction. Thus, a further hollow space is formed between the coil and the cover which in the following is also referred to as upper hollow space. Thus, the upper hollow space and the lower hollow space are delimited in the volume, wherein the mounting support and the coil as well as the core assembly are located in the volume.

The ground assembly extends in the gap direction. In addition, the ground assembly extends in a transverse direction running transversely to the gap direction and a width direction running transversely to the gap direction and transversely to the transverse direction. Advantageously, the ground assembly is substantially formed cuboid in shape.

This makes possible a simplified use of the ground assembly on the and/or at the and/or in the subsurface.

The ground assembly practically comprises power electronics which serve for the electrical supply of the coil. The power electronics can comprise one or more components, for example an inverter for converting direct current into alternating current and/or a tuneable impedance matching network for the power adjustment, also known as "TMN", and/or a power factor correction also known as "PFC". The respective component can be arranged in one of the hollow spaces and/or outside the hollow spaces in a housing that is separated from the hollow spaces, in particular magnetically shielded. This housing, which is also referred to as the outer housing here, can be substantially cuboid in shape.

The plate-shaped extension of the at least one core body transversely to the gap direction means in particular that the at least one core body extends flat in a plane defined by the width direction and the transverse direction. In particular, the extension of the core body in the gap direction is smaller than the extension in the width direction and/or in the transverse direction. Preferably, the extension of the core body in the width direction and/or in transverse direction is at least twice as large as the extension in the gap direction. Preferably, the core body has a substantially longitudinal cuboid shape.

The lower hollow space allows in particular a heat transfer from the core assembly to the baseplate and thus an effective cooling. Advantageously, a gas, preferentially air, is located in the lower hollow space so that in particular the core assembly transfers heat to the baseplate via the gas, in particular via the air. The gas is generally also referred to as air in the following.

Furthermore, the lower hollow space can serve in particular for accommodating further components of the ground assembly, for example of electronic components, in particular circuit boards, wherein at least one electronic component and/or at least one circuit board can be part of the power electronics of the assembly for supplying the coil. These further components, insofar as present, are likewise cooled via the baseplate.

In the charging device, the coil practically serves as primary coil which interacts with a secondary coil on/in the motor vehicle. During the operation, the primary coil generates a magnetic alternating field which inductively interacts with the secondary coil.

Generally, the coil can be of any design.

Preferably, the coil is a flat coil. This results in an improved electromagnetic interaction of the coil with the secondary coil of the motor vehicle. In addition, the ground assembly can be designed in a more space-saving manner. Here, the flat coil comprises a coil winding wound flat. Preferentially, the coil winding is wound, in particular spirally, in a plane running transversely to the gap direction.

The coil winding is advantageously supported in a support, which in the following is also referred to as coil winding support. The coil winding support is preferably separate from the mounting support. Here it is preferable when the coil winding support also extends plate-shaped.

The coil winding support can be supported on the mounting support. Thus, the coil winding support and the coil winding are also supported on the baseplate via the mounting support.

Practically, no electromagnetic interaction preferably takes place between the mounting support and the coil. For this purpose, the mounting support is produced from suitable materials. In particular, the mounting support is produced from plastic.

As explained above, the baseplate preferentially forms the, in the gap direction, lower component of the assembly which delimits the volume. For this reason, the baseplate can also be referred to as ground plate.

It is preferred when the baseplate is produced from a metal and/or metal alloy. Thus, an improved heat transfer to the baseplate and thus an improved cooling of the ground assembly, in particular of the core assembly and/or of the coil is achieved. In this way, the baseplate additionally serves at the same time for the electromagnetic shielding towards the side of the baseplate facing away from the coil and thus towards the outside.

Generally, the gap between the coil and the core assembly to the baseplate in the gap direction can be any. In particular, the gap amounts to between some millimetres and some centimetres. In this way, the installation space requirement is reduced. With a baseplate additionally functioning as electromagnetic shield, an optimised gap dimension from the core assembly with respect to an adequately reduced interaction of the baseplate with the core assembly with an increase of the electromagnetic shielding is additionally achieved.

The gap dimension of the coil to the core assembly in the gap direction is preferably smaller compared with the gap dimension from the core assembly to the baseplate. In particular, the gap dimension from the core assembly to the baseplate amounts to at least twice, preferentially at least four times the gap dimension from the core assembly to the coil. The gap distance of the coil from the core assembly can be provided by a thickness of the spacer plate running in the gap direction.

In preferred embodiments, the baseplate is formed as a cooling plate through which a flow path of a coolant leads. For this purpose, at least one channel delimiting the flow path can be formed in the baseplate. In this way, an active cooling of the baseplate and thus an improved cooling of the ground assembly can take place with the coolant. Here, the baseplate can be connected to a coolant circuit via suitable connection components.

Embodiments, in which the mounting support for at least one of the at least one core bodies comprises an associated support body are considered preferable. This means that the respective core body with the lower side, preferentially exclusively, is locally supported on the associated support body so that via the lower side, preferentially exclusively, a local load transfer into the associated support body takes place. Here it is particularly preferred when the support body is arranged centrally in the transverse direction and width direction of the associated core body. Advantageously, the mounting support for the respective core body comprises an associated support body which is arranged centrally in the transverse direction and width direction of the associated core body. Particularly preferably, the mounting support comprises for at least one of the at least one core bodies, advantageously for the respective core body, a single such support body. Here the knowledge that plate-shaped core bodies, in particular ferrite plates have an increased mechanical instability, are in particular brittle relative to bending stresses, which can occur in particular because of the load of the motor vehicle, and that this instability is present to a greater degree on that side on which tensile stresses occur, is utilised here. This is counteracted through the local, preferentially additionally central, arrangement of the support body so that the mechanical stability of the core body and thus of the coil is improved. In particular, a high mechanical stability with large flow space and thus improved cooling with reduced weight at the same time can thus be achieved through a local, preferentially additionally central support of the core body. It is therefore preferred when the support body is smaller in cross-section than the lower side of the core body facing the baseplate, so that the support body supports the core body locally, i.e. not over the entire lower side, and preferentially centrally. Thus, the core body is preferably supported with the lower side locally and centrally on the support body. As a consequence, a local load transfer to the support body takes place. Consequently, damage to the core body is effectively avoided or at least reduced.

Advantageous are embodiments, in which the mounting structure on the lower side facing the baseplate of at least one of the at least one core bodies comprises an opening, wherein the lower side is fluidically connected to the lower hollow space via the opening.

This leads to an improved cooling of the core body and consequently to an improved efficiency. It is preferred when the mounting structure for the respective at least one core body comprises such an opening. Thus, the cooling and consequently the efficiency of the ground assembly are further improved.

In advantageous embodiments, the mounting structure for at least one of the at least one core bodies, preferably for the respective core body, comprises a frame. The frame is dimensioned and designed in such a manner that it positions the core body in the mounting structure transversely to the gap direction. Thus, a defined position of the core body in the ground assembly is realised in a simple and accurate manner. In this way, a simplified production of the ground assembly is achieved. At the same time, the desired electromagnetic function is precisely and/or more accurately achieved through the positioning of the at least one core body and consequently the efficiency of the ground assembly increased.

Advantageously, the frame of the core body delimits the associated opening in the mounting structure. Thus a simplified construction of the mounting support, in particular of the mounting structure takes place.

Preferably, the core body is received centrally in the frame. It is preferable, furthermore, when the support body associated with the core body is arranged centrally in the frame. Thus, an advantageous force transfer and thus load transfer via the support body to the baseplate takes place. Consequently the mechanical stability in particular of the core body is improved.

The respective frame practically comprises frame walls. Here, at least one frame wall can be part of two frames. This means that the frame wall can position two neighbouring core bodies. In particular, at least one frame wall can be arranged between two neighbouring core bodies.

Alternatively or additionally to the frame, at least one of the at least one core bodies can be glued to the mounting structure for the positioning. It is likewise conceivable to over-mould the at least one core body with the frame, in particular with the mounting structure. It is also conceivable to place at least one of the at least one core bodies into a separately produced housing in order to then position it in the mounting structure.

For positioning the core body it is conceivable to form the spacer plate with protrusions projecting in the direction of the baseplate.

Preferably, the support body associated with the core body penetrates the opening so that the core body is supported with the lower side, preferentially locally and centrally, on the support body. Thus, the lower side is in contact with the support body. In this way, a local load transfer onto the support body takes place. Consequently, damage to the core body is effectively avoided or at least reduced.

In preferred embodiments, the mounting structure is stiffened and/or reinforced in the region of at least one of the at least one opening through a bracing. Here, the mounting structure comprises an associated brace for at least one of the at least one opening, which extends transversely or obliquely to the gap direction through the opening. The at least one brace is advantageously spaced apart from the lower side of the associated core body. It is also conceivable that the lower side is supported on at least one of the at least braces.

The respective brace additionally offers the advantage that it ensures a swirling-up of air on the lower side and thus results in an improved cooling of the core assembly.

A simple and improved mechanical stability can be achieved in that at least one of the at least one braces projects from the support body. In particular, the brace projects from the support body transversely to the gap direction. At least one of the at least one braces runs advantageously from the support body up to the mounting structure, in particular to the frame.

Advantageously, two or more such braces are provided for at least one of the at least one opening, advantageously for the respective opening, which are spaced apart from one another. Preferably, the braces run evenly distributed. This leads to a further increased mechanical stability of the mounting structure.

In an advantageous further development, the mounting structure comprises two frame-like cases, namely an outer case and an inner case spaced apart from the outer case. The cases each run around, in particular run around closed transversely to the gap direction. The cases are spaced apart from one another transversely to the gap direction so that between the cases an area is delimited. The at least one core body is arranged in this area. This leads to a simplified formation of the mounting structure and a simple, precise holding and/or positioning of the at least one core boy.

Here it is preferred when at least one of the at least one frames is partly formed by at least one of the cases. This means in particular that at least one of the cases at least partly forms at least one of the frame walls.

The cases are advantageously arranged concentrically. Here it is preferred when the mounting structure is open on the side of the inner case facing away from the outer case, in particular centrally. This means that the, transversely to the gap direction, central region of the mounting structure is open, preferentially additionally free of core bodies.

Generally, the respective support body of the at least one support bodies can be formed in any way.

In preferred embodiments, at least one of the at least one support bodies is designed column-like, in particular cylindrically. This leads to an increased stability of the support body and thus to an increased mechanical stability of the assembly.

Generally, the respective support body of the at least one support bodies can be formed solid.

It is also conceivable to provide in at least one of the at least one support bodies a hollow region extending in the gap direction. This leads to a simplified and weight-reduced design of the support body and furthermore to an improved cooling of the associated cooling body.

In an advantageous further development, at least one support element is provided in the upper hollow space, which supports the cover on the support structure. Thus, a load transfer from the cover via the at least one support element to the mounting structure and via the at least one support body to the baseplate takes place.

Here it is preferred when at least one of the at least one support elements is separate from the mounting structure.

Generally, at least one of the at least one support elements can be part of the cover.

Preferably, at least one of the at least one support elements, advantageously the respective support element, can be part of the coil winding support. In particular, the at least one of the at least one support elements projects from the coil winding support in the direction of the cover.

Advantageously, the at least one support element runs in the gap direction. The at least one support body and the at least one support element thus run in particular parallel.

It is preferred when at least one of the at least one support elements follows in the gap direction an associated one of the support bodies, in particular runs parallel, for example coaxially to an associated one of the support bodies. Thus, the load transfer from the cover via the support element to the support body takes place more directly, so that stresses and damage to the remaining parts are at least reduced. In this way, the mechanical stability of the ground assembly is improved. This can be improved in that the support element and the associated support body have a similar, in particular same cross-section, i.e. have a similar or same shape transversely to the gap direction.

Embodiments, in which for the respective support body an associated support element is provided, are considered advantageous.

Advantageously, the at least one support element is formed analogously to the at least one support body. This means that the at least one support element is preferably cylindrical, wherein within the support element hollow regions running in the gap direction can be provided.

Preferably, the coil winding support is connected to the cover outside in the transverse direction and/or in the width direction. For this purpose, the coil support and/or the cover can each comprise projecting shoulders which engage into one another in order to form in particular a latching connection.

On the side of the cover facing away from the coil, the ground assembly can comprise a sensor system. The sensor system serves in particular for detecting objects on the cover and/or on the subsurface. Preferentially, the sensor system is configured for detecting metallic external objects. The sensor system can thus be a foreign object detection sensor system, briefly also referred to as FOD.

It is preferred when on the side of the cover facing away from the lower hollow space at least one body projects, which in the following is also referred to as FOD holder. Particularly preferably, the at least one FOD holder serves for taking up load. This means that a load transfer to the cover takes place by way of the at least one FOD holder. In particular, the FOD holder is part of the cover. Preferably, the ground assembly, in particular the cover, comprises two or more such FOD holders which are arranged spaced apart from one another.

In advantageous embodiments, at least one of the at least one FOD holders, advantageously the respective FOD holder, runs in the gap direction. This means that the at least FOD holder runs parallel to the at least one support body, preferentially additionally parallel to the at least one support element.

In particularly preferred embodiments, an FOD holder and a support element and a support body each runs following one another in the gap direction, in particular in parallel, for example support element and support body are coaxial here. The load transfer thus takes place via the FOD holder to the support element and via the core assembly further onto the support body into the baseplate. Thus, a particularly mechanically stable design of the ground assembly with simultaneously minimised or at least reduced mechanical loading of the remaining components is achieved.

The at least one FOD holder can further serve for the positioning of the sensor system. In particular, circuit boards of the sensor system can be positioned and received by the at least one FOD holder. Here, the respective FOD holder advantageously protrudes over the sensor system on the side facing away from the lower hollow space.

It is preferred when the respective FOD holder in the gap direction is smaller than the respective support body and/or than the respective support element. The respective FOD holder is thus formed flat, in particular areally, relative to the respective support body and/or to the respective support element. Thus, the size of the ground assembly is reduced. At the same time, the gap distance of the sensor system from possible external objects to be detected is reduced. As a consequence, the detection of the external objects is simplified and/or more reliable.

An improved cooling of the ground assembly, in particular of the coil, can be achieved in that in the mounting structure at least one passage that is separate from the at least one opening is formed, which fluidically connects the lower hollow space with the upper hollow space. Thus, air can flow, in particular circulate, between the lower hollow space and the upper hollow space. Consequently, an improved heat transfer from the coil towards the upper hollow space takes place, so that there is a more effective cooling of the coil.

Preferably, the at least one passage is spaced apart from the core assembly. Particularly preferably, the at least one passage is arranged transversely to the gap direction outside the core assembly. It is conceivable in particular to form the at least one passage on the side of the outer case facing away from the inner case. In this way, an improved flow of air between the lower hollow space and the upper hollow space and consequently an improved cooling and, resulting from this, an increased efficiency of the ground assembly is achieved.

Advantageously, the coil is fluidically connected to the upper hollow space. This leads to a better heat transfer from the coil to the air in the upper hollow space and consequently an improved cooling of the coil. The fluidic connection of the coil with the upper hollow space can be realised in particular through an at least partly open design of the coil winding support.

In preferred embodiments, the ground assembly comprises a conveying device, which during the operation conveys, in particular circulates, air at least through the lower hollow space. Particularly preferably, the conveying device conveys air through the lower hollow space and the upper hollow space, circulates the air in particular through the hollow spaces. The conveying of the air leads to an improved heat transfer between the air and the baseplate, in particular the cooling plate, and between the air and the coil and the core assembly. This brings about an increased efficiency of the ground assembly.

The conveying device can comprise at least one fan, which during the operation conveys, in particular circulates, air through at least the lower hollow space. In particular, the conveying device is such a fan.

Preferably, the conveying device, in particular the at least one fan, is arranged in the region of the passage, in particular on the passage. This leads to a hermetic flow the air through the lower hollow space and/or the upper hollow space. As a consequence, the cooling is further improved and consequently the efficiency further increased.

The arrangement of the conveying device in the region of the passage further leads to the pressure drop in the air conveyed by the conveying device being reduced. Consequently, the conveying device can be operated with reduced power.

The efficiency can be improved when the conveying device, in particular the at least one fan, is alternatively or additionally arranged offset towards the baseplate. This leads to an increased heat transfer from the air to the baseplate, in particular cooling plate, and thus to an improved cooling.

Preferred embodiments provide that in the lower hollow space on the baseplate and spaced apart from the core assembly a heat transfer structure for enlarging the heat-transferring area is arranged. The heat transfer structure is thus heat-transferringly connected to the baseplate and serves the purpose of enlarging the area onto which the air transfers heat. Thus, the cooling is further improved and consequently the efficiency further increased. The heat transfer structure is advantageously attached to the baseplate.

The heat transfer structure can generally be of any design. In particular, the heat transfer structure can comprise a corrugated rib and/or pins or pin-shaped ribs and the like.

Preferably, the heat transfer structure is arranged in a region of the lower hollow space which in the gap direction is not followed by a core body. This means in particular that the region on the side of the heat transfer structure facing away from the baseplate is free of core bodies. In this way, an electromagnetic interaction of the core assembly with the heat transfer structure is prevented or at least reduced. At the same time, the heat transfer structure can in this way be formed larger in the gap direction so that the area, onto which the air transfers heat, is enlarged. This leads to an improved cooling and an increased efficiency.

Such a region is present in particular on the side of the passage facing the baseplate.

Alternatively or additionally, such a region can be present on the side of the inner branches facing away from the outer case and thus within the central region of the mounting structure designed open. Such an arrangement of the heat transfer structure has the advantage, furthermore, that the heat transfer structure is arranged centrally and spaced apart from the conveying device arranged in the region of the passage. In this way, a hermetic flow of the air through the hollow spaces and also a reduction of the pressure drop in the air takes place with improved cooling at the same time.

For the improvement of the cooling, a flow conductor can be provided for the heat transfer structure which during the operation of the conveying device conducts air in the direction of the heat transfer structure. For this purpose, the flow conductor is suitably arranged and/or formed. It is conceivable to provide the flow conductor on the mounting support, in particular on the mounting structure. In particular, the flow conductor can be moulded onto the mounting support and/or be part of the mounting support.

It is conceivable to provide on the lower side of at least one of the at least one core bodies a cooling rib projecting from the lower side into the lower hollow space. Thus, a heat transfer from the core body to the air and thus a cooling is further improved. Here, the cooling rib is preferably separate from the core body and in particular magnetically inactive. In particular, the cooling rib can be a ceramic rib.

It is preferred when the at least one cooling rib projects through the opening belonging to the associated core body into the lower hollow space.

On the side of the cover facing away from the upper hollow space in the gap direction, the ground assembly can comprise a covering, via which load is transferred to the cover, preferably to the at least one FOD holder. Besides the cover, the covering can also extend over further parts of the ground assembly not described here.

The ground assembly can comprise a housing in which further parts of the ground assembly can also be received. Here, the housing serves in particular for protection, for example for the entering of liquids in the respective hollow space.

Practically, the housing is configured in such a manner that it does not or as little as possible influence the electromagnetic interaction of the coil of the ground assembly with an associated coil in the motor vehicle. For example, the housing consists of a non-metal, for example of plastic.

For the protection of the lower hollow space, advantageously also of the upper hollow space against the entering of fluids, in particular of liquids, at least one seal can be provided between the baseplate and the mounting support and/or between the cover and the baseplate or the coil winding support.

Preferably, the mounting support comprises transversely to the gap direction an outer wall which on the outside projects from the mounting structure to the baseplate, which additionally supports the mounting structure on the baseplate. Advantageously, at least one seal for sealing the lower hollow space is arranged between the outer wall and the baseplate.

For charging a motor vehicle, the ground assembly interacts with a corresponding assembly in/on the motor vehicle. Practically, the ground assembly is spaced apart from the assembly of the motor vehicle so that a contactless and/or wireless charging of the motor vehicle takes place.

Further important features and advantages of the invention are obtained from the claims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
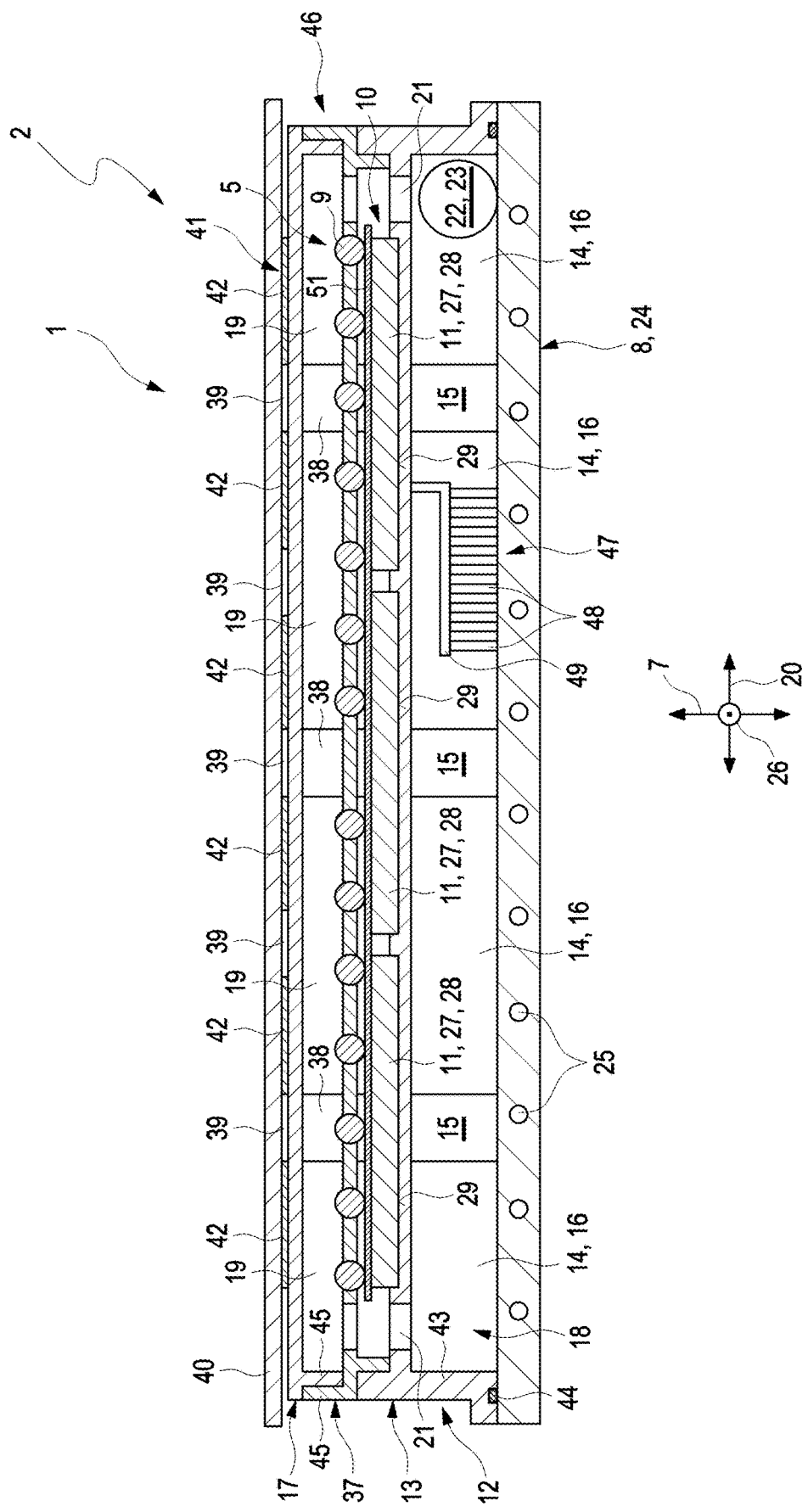
FIG. 1 a section through a ground assembly of an inductive charging device.
Figure 2:
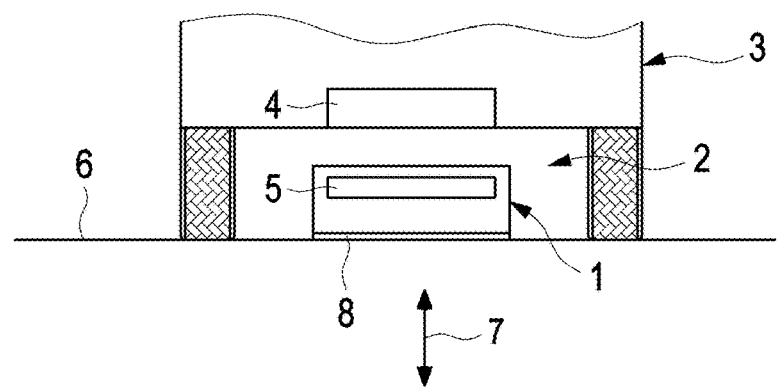
FIG. 2 a greatly simplified representation of the inductive charging device with the ground assembly and a motor vehicle, FIG. 3 a bottom plan view towards a mounting support of the ground assembly, FIG. 4 a top plan view towards the mounting support, FIG. 5 a section through the ground assembly in the region of the mounting support, FIG. 6 a section through a support body of the mounting support in another exemplary embodiment of the ground assembly, FIG. 7 the view from FIG. 1 in a further exemplary embodiment of the ground assembly.

A ground assembly 1 according to the invention, such as are shown for example in the FIGS. 1 to 7, is employed in a charging device 2 shown exemplarily and greatly simplified in FIG. 2 for the inductive charging of a motor vehicle 3. For this purpose, the ground assembly 1 interacts with an associated assembly 4 of the motor vehicle 3. The interaction takes place in particular through a coil 5 of the ground assembly 1, which serves as primary coil 5 of the charging device 2, and a secondary coil of the assembly 4 of the motor vehicle 3 which is not shown. The motor vehicle 3 is part on a subsurface 6 for the inductive charging by means of the charging device 2. In the shown exemplary embodiment, the ground assembly 1 is arranged on the subsurface 6 and lies on the subsurface 6.

The ground assembly 1 comprises a baseplate 8 which in a gap direction 7 is near the subsurface 6, in particular lies on the subsurface 6. Here, the gap direction 7 runs parallel to a normal of the subsurface 6 and in particular along the vertical direction. According to the FIGS. 1 and 7, the coil 5 is arranged on the side of the baseplate 8 which in the gap direction 7 faces away from the subsurface 6 and spaced apart in the gap direction 7 from the baseplate 8. The coil 5 comprises a coil winding 9. The ground assembly 1, furthermore, comprises a core assembly 10 with at least one core body 11. The core assembly 10 is arranged on the side of the baseplate 8 facing away from the subsurface 6 and spaced apart from the baseplate 8 in the gap direction 7. In addition, the core assembly 10 is spaced apart from the coil 5 in the gap direction 7. Here, the core assembly 10 with the at least one core body 11 is arranged between the baseplate 8 and the coil 5. The core assembly 10, in particular the at least one core body 11, is held in the ground assembly 1 by means of a mounting support 12 and supported on the baseplate 8. For this purpose, the mounting support 12 comprises a mounting structure 13 which in the gap direction 7 is spaced apart from the baseplate 8, wherein the at least one core body 11 is arranged on the side of the mounting structure facing away from the baseplate 8 and positioned through the mounting structure 13 in a plane running transversely to the gap direction 7. Between the mounting structure 13 and the baseplate 8 a hollow space 14 is formed and delimited, which in the following is also referred to as lower hollow space 14. Furthermore, the mounting support 12 comprises at least one locally arranged support body 15, which in the gap direction 7 extends through the lower hollow space 14 and supports the at least one core body 11 on the baseplate 8. In particular, the at least one support body 15 extends in the gap direction 7 as far as to the baseplate 8 and is supported on the baseplate 8. Through the local formation of the at least one support body 15 a correspondingly local transfer of the load exerted in particular from the motor vehicle 3 to the core assembly 10 takes place. This local load transfer leads to a reduction of the loading of the at least one core body 11 caused by the load transfer. In this way, an increased mechanical stability of the ground assembly 1 and/or a longer lifespan is achieved. Through the local design of the at least one support body 15, the at least one support body 15 fills the lower hollow space 14 merely locally and thus partially, so that a flow space 16 for a fluid, in the shown exemplary embodiments for air, remains. Thus, the core assembly 10 in particular can give off heat to the baseplate 8 via the air so that a cooling of the core assembly 11 and of the coil 5 is improved and consequently the efficiency of the ground assembly 1 increased. Thus it is also possible to operate the ground assembly 1 with high outputs of in particular multiple kW and consequently charge the motor vehicle 3 to be charged more quickly.

In the shown exemplary embodiments, the ground assembly 1 of the ground plate 8, in the gap direction 7 facing away from the subsurface 6 and located opposite, comprises a cover which, with the baseplate 8 in the gap direction 7, delimits a volume 18. Here, the coil 5, the core assembly 11 and the mounting support 12 are arranged in the volume 18 between the baseplate 8 and the cover 17. Thus, the lower hollow space 14 is also formed in the volume 18. The cover 17 is spaced apart from the coil 5 in the gap direction 7 so that between the cover 17 and the coil 5 a further hollow space 19 is delimited, which in the following is also referred to as upper hollow space 19. In the shown exemplary embodiments, the lower hollow space 14 and the upper hollow space 19 are fluidically connected to one another via two passages 21 arranged in a width direction 20 running transversely to the gap direction 7 outside the core assembly 10 and are located opposite. In the shown exemplary embodiments, the ground assembly 1 comprises a conveying device 22, in particular at least one fan 23, which during the operation in the volume 18 conveys air, which circulates in particular through the hollow spaces 14, 19. Through the flow, in particular the circulation of the air, the air flows through both hollow spaces 14, 19 and absorbs heat from the coil 5 and from the core assembly 11. In the process, the air passes this heat onto the baseplate 8 so that an improved cooling of the coil 5 and of the core assembly 11 takes place. In the shown exemplary embodiments, the baseplate 8 is designed as a cooling plate 24 through which a flow path of a coolant delimited by channels 25 leads. During the operation, the coolant actively cools the baseplate 8. The actively cooled baseplate 8 in turn cools the air and consequently, via the air, the coil 5 and the core assembly 10. Here, the baseplate 8 is advantageously produced from a metal or a metal alloy in order to improve the heat transfer between coolant, baseplate 8 and air. Because of the spaced-apart arrangement of the baseplate 8 from the coil 5 and core assembly 10, an electromagnetic interaction of the baseplate 8 with the coil 5 and the core assembly 10 is minimised or at least reduced. The gap distance from the baseplate 8 to the core assembly 10 in the gap direction 7 can amount to between some millimetres and some centimetres. By producing the baseplate 8 out of a metal or a metal alloy, an electromagnetic shielding of the ground assembly 1 towards the subsurface 6 takes place at the same time.

Figure 3:
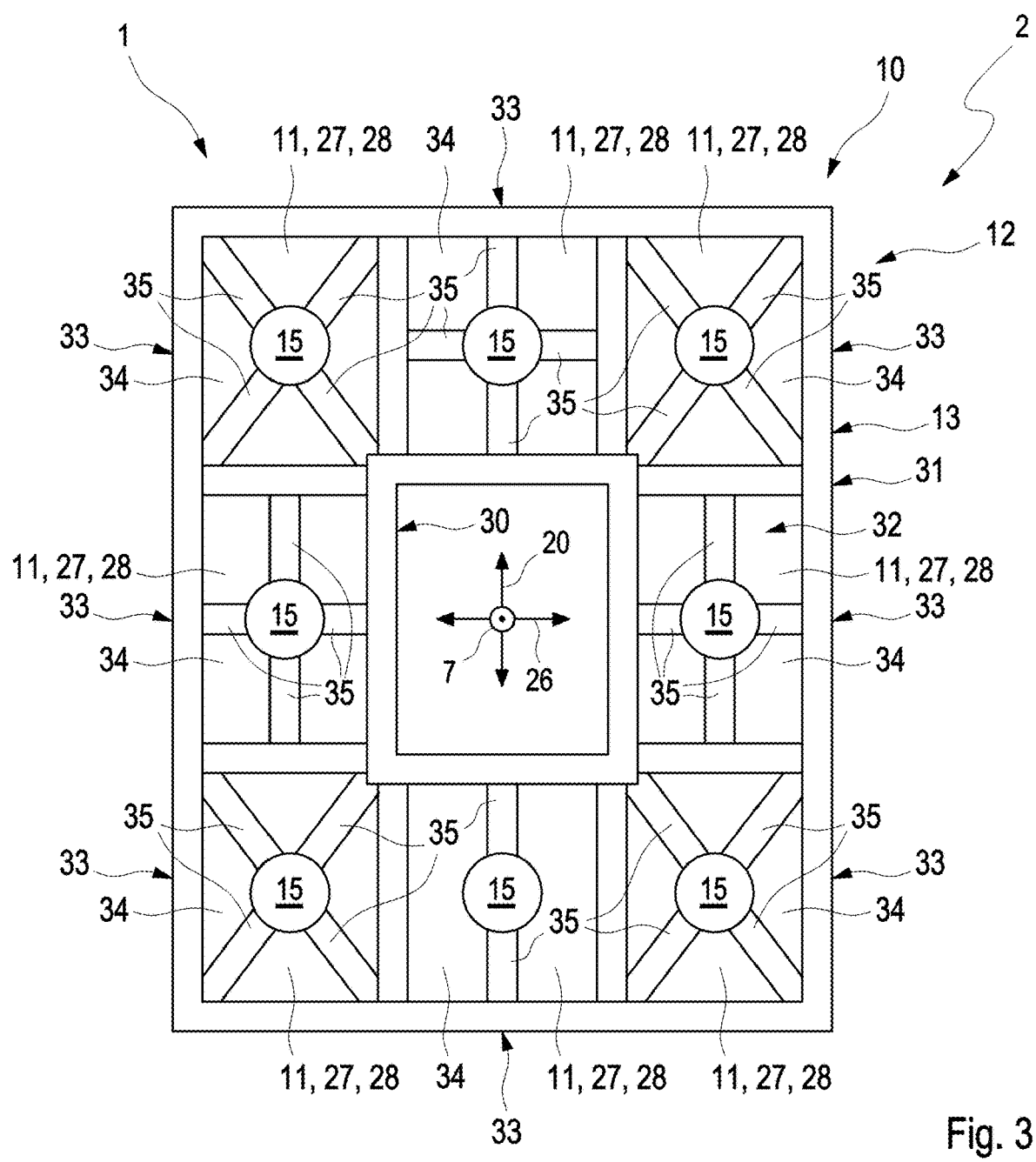

FIG. 3 shows a plan view of the ground assembly 1 from the baseplate 8 in the direction of the mounting structure 13. There, merely the mounting support 12 and the core assembly 10 are visible in FIG. 3. FIG. 4 shows a plan view of the ground assembly 1 from the cover 17 in the direction of the core assembly 10, wherein the at least one core body 11 and the mounting support 12 are visible. FIG. 5 shows a section through the ground assembly 1 in the region of a support body 15.

As is evident in particular from the FIGS. 3 and 5, the ground assembly 1 of the shown exemplary embodiments comprises purely exemplarily eight core bodies 11, which are formed cuboid-shaped and exemplarily identically. The respective core body 11 is formed plate-shaped and extends plate-shaped in the width direction 20 and a transverse direction 26 running transversely to the width direction 20 and transversely to the gap direction 7. The respective core body 11 is advantageously a ferrite body 27, in particular a ferrite plate 28.

As is evident in particular from the FIGS. 1 and 3 as well as 7, the mounting support 12 of the shown exemplary embodiments comprises at least 2 support bodies 15 spaced apart from one another. Here, the support bodies 15 are each formed column-like and are in particular cylindrical in shape. In the shown exemplary embodiments, at least one of the support bodies 15 is arranged, with respect to an associated core body 11, centrally in the associated core body 11, i.e. centrally in the width direction 20 and in the transverse direction 26. Furthermore, a single such support body 15 is assigned in the shown exemplary embodiments to the respective core body 11, so that the mounting support 12, corresponding to the number of the core bodies 11, comprises a total of eight support bodies 15. The respective core body 11 is preferably supported on the associated support body 15. As is evident, furthermore, in particular from FIG. 3, the respective support body 15 is smaller in cross-section than the associated core body 11, in particular than a lower side 29 of the core body 15 facing the baseplate 8 and thus the core body 15. Thus, the respective core body 15 is locally supported on the associated support body 15 and consequently a local load transferred from the respective core body 15 into the associated support body 15. Here, the support bodies 15 in the shown exemplary embodiments are likewise formed identically corresponding to the identical design of the core bodies 11. Through the central arrangement of the only associated support body 15, a central and locally limited load transfer from the respective core body 11 to the support body 15 takes place here, so that corresponding bending stresses and tensile stresses on the core body 11 can be offset in an improved manner.

As is evident in particular from the FIGS. 3 and 4, the mounting structure 11 of the shown exemplary embodiments comprises an inner frame 30, which in the following is also referred to as inner case 30. In addition, the mounting structure 11 comprises an outer frame 31 surrounding the inner case 30, which in the following is also referred to as outer case 31. In the shown exemplary embodiments, the cases 30, 31 are arranged concentrically and transversely to the gap direction 7 running around closed. The cases 30, 31 of the shown exemplary embodiments each have a quadrangular basic shape. The cases 30, 31 are arranged spaced apart from one another so that between the cases 31, 31 an area 32 is delimited, in which the core bodies 11 are arranged. Additionally, the side of the inner case 30 facing away from the outer case 31 is open in the shown exemplary embodiments so that the mounting structure 13 is formed open centrally. As is evident, furthermore, in particular from the FIGS. 3 and 4, the central region of the mounting structure 13 is free of core bodies 11. In the shown exemplary embodiments, the mounting structure 13 comprises an associated frame 33 for the respective core body 11, in which the core body 11 is received and positioned. This is evident in particular from the FIGS. 3 and 4, the respective frame 33 can be partly formed by one of the cases 30, 31 each.

As is evident in particular from FIG. 3, the mounting structure 13 comprises an opening 34 for the respective core body 11, which fluidically connects the lower side 29 of the core body 11 with the lower hollow space 14. Thus, the air in the lower hollow space 14, in particular the air flowing through the lower hollow space 14, is directly in contact with the lower side 29 and can better cool the core body 11. As is evident in particular from the FIGS. 3 and 5 furthermore, the mounting support 12 for the respective opening 34 comprises at least one associated brace 35 for stiffening and/or mechanically stabilising the mounting structure 13 in the region of the opening 34. In the shown exemplary embodiments, at least two such braces 35 are provided for the respective opening 34, which are spaced apart from one another. The respective brace 35 extends transversely to the gap direction 7. In FIG. 3, four braces 35 and two braces 35 are purely exemplarily provided for seven of the altogether eight openings 34 and for one of the openings 34 respectively. In the shown exemplary embodiments, the braces 35 of the respective opening 34 project from the support body 15 belonging to the associated core assembly 10. There, the respective brace 35 runs from the support body 15 as far as to one of the cases 30, 31. Besides the improved mechanical stability of the mounting structure 13, the braces 35 ensure a swirling-up of the air flowing through the lower hollow space 14 and thus an improved cooling of the core bodies 11.

Generally, the respective support body 15 can be designed solid. As is evident from FIG. 6, at least one of the support bodies 15 can also comprise at least one hollow region 36 running in the gap direction 7, wherein in FIG. 6 a central hollow region 36 and further hollow regions 36 exemplarily surrounding these are shown, so that altogether 9 hollow regions 36 are provided.

Figure 7:
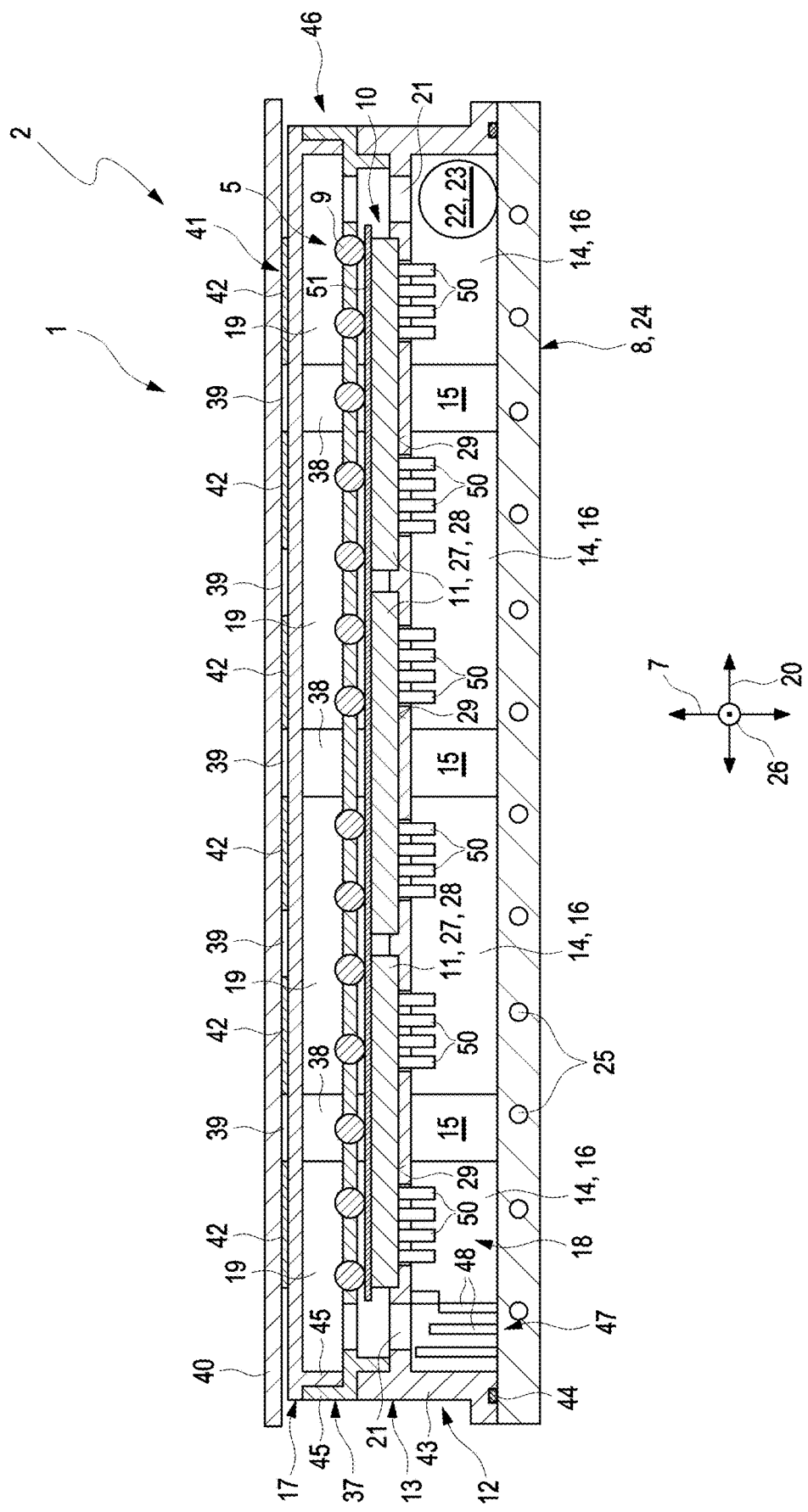

In the shown exemplary embodiments, the coil winding 9, as is evident from the FIGS. 1 and 7, is received in a plate-shaped support 37 which in the following is also referred to as coil winding support 37. The coil winding support 37 is arranged on the side of the core assembly 10 facing away from the baseplate 8. Here, the coil winding support 37 is at least partly open on the side facing the cover 17, so that the coil winding 9 is fluidically connected to the upper hollow space 19. Thus, the coil winding 9 is in contact with the air in the upper hollow space 19 so that there is an improved cooling of the coil winding 9.

As is evident in particular from the FIGS. 1 and 7, a spacer plate 51 is arranged in the shown exemplary embodiments between the coil 5 and the core assembly 10, in particular between the coil winding support 37 and the core assembly 10, which preferentially consists of plastic and is magnetically permeable. The spacer plate 51 spaces the core assembly 10 apart from the coil 5. There, the spacer plate 51 lies on the core assembly 10. In addition, the coil winding support 37 is supported on the spacer plate 51. Furthermore, the coil 5 can be supported on the spacer plate 51.

As is evident, furthermore, from the FIGS. 1 and 7, at least one local support element 38 runs in the shown exemplary embodiments in the gap direction 7 between the cover 17 and the coil winding support 37. In the shown exemplary embodiments, multiple support elements 38 are provided here which run in the gap direction 7 and are arranged spaced apart from one another. Thus, the support elements 38 extend parallel to the support bodies 15. As is evident, furthermore, from the FIGS. 1 and 7, the support elements 38 are formed identically in the shown exemplary embodiments. The support elements 38 serve in particular for the load transfer from the cover 17 into the coil winding support 37 and thus via the coil winding support 37, the spacer plate 51 and core bodies 11 into the support bodies 15. In the shown exemplary embodiments, such a support element 38 is assigned to the respective support body 15, which in the gap direction 7 follows the support body 15, runs in particular parallel, for example coaxially to the support body 15, so that as direct as possible a load-transfer takes place from the respective support element 38 into the associated support body 15. In the shown exemplary embodiments, the support elements 38 are part of the coil winding support 37.

As is evident from the FIGS. 1 and 7, at least one local body 39 projecting from the cover 17 in the gap direction, which can be in particular part of the cover 17, is arranged in the shown exemplary embodiments on the side of the cover 17 facing away from the baseplate 8. The at least body 39 thus extends parallel to the at least one support element 38 and parallel to the at least one support body 15. Here, the at least one body 39 serves for the load-transfer from a covering 40 on the side of the cover 17 facing away from the baseplate 8 and spaced apart from the cover 17 to the cover 17. In the shown exemplary embodiments, the ground assembly 1 comprises multiple such bodies 39 which in the following are also referred to as FOD holders 39. In the shown exemplary embodiments, an associated FOD holder 39 is provided here for the respective support element 38 and thus for the respective support body 15, which in the gap direction 7 follows the associated support element 38, in particular runs parallel, for example coaxially to the same. In addition, further positioning bodies 39 are provided in the shown exemplary embodiments. Thus, there is a direct load-transfer from the respective FOD holder 39 into the associated support element 38 and further into the spacer plate 51 and via the core assembly 10 into the support bodies 15. As is evident from the FIGS. 1 and 7, the FOD holders 39 are formed identically in the shown exemplary embodiments. As is evident from the FIGS. 1 and 7, furthermore, the support bodies 15, the support elements 38 and the FOD holders 39 have a same cross-section each transversely to the gap direction 7.

As is evident from the FIGS. 1 and 7, the ground assembly 1 comprises a sensor system 41 in the shown exemplary embodiments on the side of the cover 17 facing away from the baseplate 8, between the cover 17 and the covering 40, which for example serves for detecting foreign bodies on the subsurface 6. Here, the sensor system 41 can comprise at least one circuit board 42, which is positioned by way of the FOD holder 39. Here, the FOD holders 39 protrude over the sensor system 41 in the gap direction 7 on the side facing away from the baseplate 8 and thus towards the covering 40.

From the FIGS. 1 and 7 it is evident that the mounting support 12 in the shown exemplary embodiments comprises outside an outer wall 43 projecting transversely to the gap direction 7 in the direction of the baseplate 7, via which the mounting support 12 is additionally supported on the baseplate 8. Here, the volume 18 is delimited by the outer wall 43 in the region of the lower hollow space 14 transversely to the gap direction 7. As is further evident from the FIGS. 1 and 7, at least one seal 44 is provided in the shown exemplary embodiments between the outer wall 43 and the baseplate 8, which seals the volume 18, in particular the lower hollow space 14, towards the outside.

As is evident from the FIGS. 1 and 7, the coil winding support 37 and the cover 17 comprise shoulders 45 projecting outside in the shown exemplary embodiments transversely to the gap direction 7 and facing one another in the gap direction 7, which engage into one another and thus establish a connection between the cover 17 and the coil winding support 37. Here, the connection is in particular a latching connection 46. Here, the volume 18, in particular the upper hollow space 19, is delimited transversely to the gap direction 7 by at least one of the shoulders 45.

As is evident from the FIGS. 1 and 7, the conveying device 22, in particular the fan 23, in the shown exemplary embodiments is arranged in the region of one of the passages 21 and offset towards the baseplate 8. Thus, an improved and homogenous flow through the hollow spaces 14, 19, in particular a hermetic circulation of the air through the hollow spaces 14, 19 is achieved.

In the exemplary embodiment of FIG. 1, the ground assembly 1, for enlarging the area transferring heat with the air comprises a structure 47, which in the following is also referred to as heat-transfer structure 47. The heat-transfer structure 47 is spaced apart from the core assembly 10 in the gap direction 7. Here, the heat-transfer structure 47 is preferentially arranged in the open region of the mounting structure 13, i.e. on the side of the inner case 30 facing away from the outer case 31. Thus, the heat-transfer structure 47 is arranged in a region in which no core body 11 is arranged. In this way, an electromagnetic interaction of the core assembly 10 with the heat-transfer structure 47 is minimised or at least reduced. In addition, the heat-transfer structure 47 can be designed larger in the gap direction 7 in this manner, so that the heat-transferring area is larger. In the exemplary embodiment shown in FIG. 1, the heat-transfer structure 47 is formed by pins or pin-like ribs 48 projecting from the baseplate 8 in the gap direction 7. In the shown exemplary embodiment, a flow conductor 49 is provided for the heat-transfer structure 47, which steers air flowing through the lower hollow space 14 in the direction of the heat-transfer structure 47. In the shown exemplary embodiment, the flow conductor 49 projects from the mounting structure 13 in the direction of the lower hollow space 14. In particular, the flow conductor 49 can be part of the mounting support 12.

In the exemplary embodiment shown in FIG. 7, the heat-transfer structure 47 is arranged in the region of one of the passages 21 and spaced apart from the conveying device 22, here in the region of the passage 21 spaced apart from the conveying device 22. In this exemplary embodiment, the heat-transfer structure 47 is thus also arranged in a region in which no core body 11 is arranged. In this exemplary embodiment, the heat-transfer structure 47 also comprises pins or pin-like ribs 48 projecting from the baseplate 8, which in FIG. 7 have different extensions running in the gap direction 7.

In the exemplary embodiment shown in FIG. 7, at least one of the core bodies 11, in the shown exemplary embodiment of the respective core body 11, at least one cooling rib 50 projecting into the lower hollow space 14 is attached to the lower side 29. In the exemplary embodiment shown in FIG. 7, multiple such cooling ribs 50 are attached to the respective lower side 29 which are spaced apart from one another transversely to the gap direction 7. The cooling ribs 50 lead to an improved heat transfer of the associated core bodies 11 via the lower side 29 to the air and thus to an improved cooling. In addition, the cooling ribs 50 generate swirls in the airflow and thus ensure a further improved cooling. Practically, the cooling ribs 50 are magnetically inactive. In particular, the cooling ribs 50 are produced from ceramic.

The invention claimed is:

1. A ground assembly for an inductive charging device for inductively charging a motor vehicle parking on a subsurface, comprising:
a baseplate,
a coil that includes at least one coil winding and is spaced apart from the baseplate by a gap in a gap direction, the baseplate extending plate-shaped transversely to the gap direction,
a core assembly for a magnetic flux control, the core assembly spaced apart in the gap direction from the baseplate and from the coil and arranged between the baseplate and the at least one coil winding,
the core assembly including at least one core body that extends plate-shaped transversely to the gap direction,
a mounting support for holding the core assembly,
the mounting support including a mounting structure that is spaced apart from the baseplate in the gap direction and positions the at least one core body,
wherein a lower hollow space is disposed between the mounting structure and the baseplate,
wherein the mounting support includes at least one support body between the mounting structure and the baseplate, the at least one support body extending in the gap direction through the lower hollow space and supports the core assembly on the baseplate, and
wherein the at least one support body leaves a flow space vacant in the lower hollow space, through which a flow path leads.

2. The ground assembly according to claim 1, wherein the mounting support for the at least one core body includes an associated support body, on which the at least one core body is locally supported.

3. The ground assembly according to claim 1, wherein:
the mounting structure, on a lower side facing the baseplate, has an opening, and
the lower side, via the opening, is fluidically connected to the lower hollow space.

4. The ground assembly according to claim 1, wherein the mounting structure, for the at least one core body, includes a frame that positions the at least one core body transversely to the gap direction.

5. The ground assembly according to claim 3, wherein the at least one support body is associated with the at least one core body and enters the opening so that the at least one core body with the lower side is supported on the at least one support body.

6. The ground assembly according to claim 3, wherein the mounting structure, for the opening, comprises an associated brace that extends through the opening transversely or obliquely to the gap direction.

7. The ground assembly according to claim 6, wherein the brace projects from the at least one support body associated with the opening.

8. The ground assembly according to claim 4, wherein:
the mounting structure further includes an outer case and an inner case spaced apart from the outer case, the outer case and the inner case in each case running around transversely to the gap direction, and
the frame is partly formed by at least one of the outer case and the inner case.

9. The ground assembly according to claim 1, wherein the at least one support body is formed column-like.

10. The ground assembly according to claim 1, wherein the baseplate is a cooling plate through which a flow path of a coolant leads.

11. The ground assembly according to claim 1, further comprising a cover arranged on a side of the at least one coil winding facing away from the baseplate and spaced apart from the at least one coil winding in the gap direction,
wherein an upper hollow space is disposed between the mounting structure and the cover.

12. The ground assembly according to claim 11, wherein at least one passage is separate from an opening disposed on a lower side of the mounting structure facing the baseplate, and wherein the at least one passage fluidically connects the lower hollow space with the upper hollow space.

13. The ground assembly according to, claim 1, further comprising a conveying device that during operation conveys air at least through the lower hollow space.

14. The ground assembly according to claim 11, further comprising a support element provided for the at least one support body, wherein the support element extends between the cover and the mounting structure and, in the gap direction, follows the at least one support body.

15. The ground assembly according to claim 1, further comprising a heat-transfer structure disposed in the lower hollow space for enlarging a heat-transferring area, the heat-transfer structure arranged on the baseplate and spaced apart from the core assembly.

16. The ground assembly according to claim 15 further comprising a flow conductor provided for the heat-transfer structure, wherein the flow conductor during operation of a conveying device conducts air in a direction of the heat transfer structure.

17. The ground assembly according to claim 1, wherein, on a lower side of the at least one core body facing the baseplate, a cooling rib projecting from the lower side into the lower hollow space is arranged.

18. A ground assembly for an inductive charging device for inductively charging a motor vehicle parking on a subsurface, comprising:
a baseplate;
a coil that includes at least one coil winding and is spaced apart from the baseplate by a gap in a gap direction, wherein the baseplate extends plate-shaped transversely to the gap direction;
a core assembly for a magnetic flux control, the core assembly spaced apart in the gap direction from the baseplate and from the coil and arranged between the baseplate and the at least one coil winding;
the core assembly including at least one core body that extends plate-shaped transversely to the gap direction;
a mounting support for holding the core assembly;
the mounting support including a mounting structure that is spaced apart from the baseplate in the gap direction and positions the at least one core body;
wherein a lower hollow space is disposed between the mounting structure and the baseplate;
wherein the mounting support includes at least one support body between the mounting structure and the baseplate, the at least one support body extending in the gap direction through the lower hollow space and supports the core assembly on the baseplate;
wherein the at least one support body leaves a flow space vacant in the lower hollow space, through which a flow path leads; and
wherein the at least one core body is centrally supported on the at least one support body.

19. The ground assembly according to claim 18, wherein the mounting structure includes a frame that positions the at least one core body transversely to the gap direction.

20. The ground assembly according to claim 19, wherein the mounting structure has an opening on a lower side of the at least one core body facing the baseplate, and wherein the lower side, via the opening, is fluidically connected to the lower hollow space.

* * * * *